United States Patent [19]

Nishida et al.

[11] Patent Number: 5,027,242
[45] Date of Patent: Jun. 25, 1991

[54] MAGNETIC DISK APPARATUS HAVING AT LEAST SIX MAGNETIC DISKS

[75] Inventors: Hiroshi Nishida, Oiso; Tatsuya Ishigaki, Yokohama; Atsushi Ito, Odawara; Yoshinobu Kudou, Minami-ashigara; Hiroshi Katou, Hadano; Kousuke Fujii, Koganei, all of Japan

[73] Assignee: Hitachi, Ltd., Tokyo, Japan

[21] Appl. No.: 446,788

[22] Filed: Dec. 6, 1989

[30] Foreign Application Priority Data

Dec. 9, 1988 [JP] Japan .............................. 63-311712

[51] Int. Cl.$^5$ .......................... G11B 5/55; G11B 5/012
[52] U.S. Cl. .................................. 360/106; 360/97.01; 360/107; 360/98.01; 360/105
[58] Field of Search ................... 360/104–107, 360/97.01, 98.02, 98.03, 98.08, 137

[56] References Cited

U.S. PATENT DOCUMENTS

| | | | |
|---|---|---|---|
| 4,445,159 | 4/1984 | Nemoto et al. | 360/137 X |
| 4,639,863 | 1/1987 | Harrison et al. | 360/98.01 |
| 4,669,004 | 5/1987 | Moon et al. | 360/77 |
| 4,879,617 | 11/1989 | Sampietro et al. | 360/106 |
| 4,899,237 | 2/1990 | Tochiyama et al. | 360/98.02 X |
| 4,930,029 | 5/1990 | Morita | 360/97.01 X |
| 4,935,830 | 6/1990 | Hiraoka et al. | 360/106 |
| 4,937,693 | 6/1990 | Connolly et al. | 360/106 X |

FOREIGN PATENT DOCUMENTS

60-29928 2/1985 Japan .
60-54269 4/1985 Japan .
63-53770 3/1988 Japan .

Primary Examiner—John H. Wolff
Assistant Examiner—Alfonso Garcia
Attorney, Agent, or Firm—Fay, Sharpe, Beall, Fagan, Minnich & McKee

[57] ABSTRACT

A magnetic disk apparatus has a base member and a cover mounted on the base member to form an enclosure having at least six magnetic disks rotatably supported therein. First and second transducers are included for writing information on and reading information from upper and lower surfaces of adjacent ones of the magnetic disks. The transducers are supported by leaf springs in close proximity to both surfaces of adjacent ones of the magnetic disks. The leaf springs extend in a radial direction with respect to the magnetic disks and are supported on one end by a plurality of head arms. The leaf springs are arranged substantially within the same plane parallel to the magnetic disks so they do not overlie one another. A voice coil motor is provided for moving the head arms in order to position the transducer pairs in predetermined positions. A circuit board is included for controlling the magnetic disk apparatus.

18 Claims, 5 Drawing Sheets

MAGNETIC DISK APPARATUS HAVING AT LEAST SIX MAGNETIC DISKS

BACKGROUND OF THE INVENTION

The present invention relates to a magnetic disk apparatus and, more particularly, relates to a magnetic disk apparatus having a large storage capacity.

In a magnetic disk apparatus used as an external memory for a computer, a magnetic head floating on a recording face of the magnetic disk with a predetermined gap left therebetween operates for recording and reproducing an objective information on the magnetic disk through magnetic flux.

Accordingly, in order to attain and realize a large capacity construction of the magnetic disk apparatus, it is of importance that a recording density of the magnetic information on the magnetic disk is enhanced, and that the magnetic disk is packaged with as many disks as possible within the apparatus housing case, which is limited in size in accordance with various restrictions.

The recording density of magnetic disks has been enhanced in recent years, which is the result of an improvement in magnetic materials constituting the magnetic disk, an improvement in the high frequency characteristics of magnetic heads for recording magnetic information on the magnetic disk and so forth.

The recording density of magnetic information on a magnetic disk and a floating gap of the magnetic head are related in inverse proportion. A standard minimum floating gap is 0.2 $\mu$m or so today. Thus, the stability of the floating gap must be accurately maintained from the viewpoint of realizing a large capacity construction and high reliability of the magnetic disk apparatus.

A desired floating gap is obtained for the magnetic head by balancing a dynamic lift of an air viscous flow generated from the rotation of the magnetic disk and a pressure force created by a leaf spring or the like packaged with the head arm. Accordingly, the aforementioned dynamic lift and pressure must be controlled with high precision so as to accurately maintain the floating gap. The dynamic lift can be set precisely by keeping the width of the magnetic heads and the rotational frequency of the magnetic disk constant with high accuracy. The pressure can be controlled by keeping a spring constant of the leaf spring uniform and by precisely maintaining the relative position between the magnetic disk and the magnetic head.

The situation being such as mentioned, the cardinal point for realizing a large capacity construction of a magnetic disk apparatus lies in packaging a multiplicity of magnetic disks within a housing case limited in size, and placing the magnetic disk and the magnetic head in precise relative position at the time of assembling the apparatus.

The prior art, for example in U.S. Pat. No. 4,669,004, concerns a conventional magnetic disk apparatus as one of known construction having therein magnetic disks. In Japanese Laid-Open patent 63-53770, the art disclosed refers to the head arm structure.

SUMMARY OF THE INVENTION

In a well-known 5.25-inch half height size magnetic disk apparatus (146 mm wide×203 mm long×41.3 mm height) or 3.5-inch standard size magnetic disk apparatus (101.6 mm wide×146 mm long×41.3 mm height), for example, the number of magnetic disks ready for packaging is generally 3 to 4 or so.

An object of the invention is to provide a magnetic disk apparatus capable of enhancing a storage capacity of information per apparatus by increasing the number of magnetic disks that are packaged within a housing of conventional size.

Another object of the invention is to provide a magnetic disk apparatus capable of achieving a high relative positional precision between a magnetic disk and a magnetic head.

A magnetic disk apparatus of this invention has a spindle for rotating a plurality of magnetic disks thereon, an actuator for holding magnetic heads and positioning them along the radius of the magnetic disks, a base for supporting the spindle and actuator , and a cover for enclosing said magnetic disks held on the spindle and the actuator. The space between the magnetic disks is substantially the same as a sum of the heights of the magnetic head and the margin space that allows for movement of the magnetic head. The magnetic heads positioned between adjacent magnetic disks are disposed so as not to lie one upon another in the direction in which the magnetic disks are arrayed. The magnetic disk apparatus is packaged with six or more magnetic disks. The head arm constituting the actuator and supporting the magnetic heads has a construction of sheet metal of 1.0 mm or less thickness.

In assembling the magnetic disk apparatus, the spindle and the actuator are secured to the base with an adhesive after being precisely positioned with an assembly jig.

The above and other objects of the invention and novel features will become apparent upon an understanding of the following detailed description and accompanying drawings.

DETAILED DESCRIPTION OF THE PREFERRED EMBODIMENT

Figure 1:
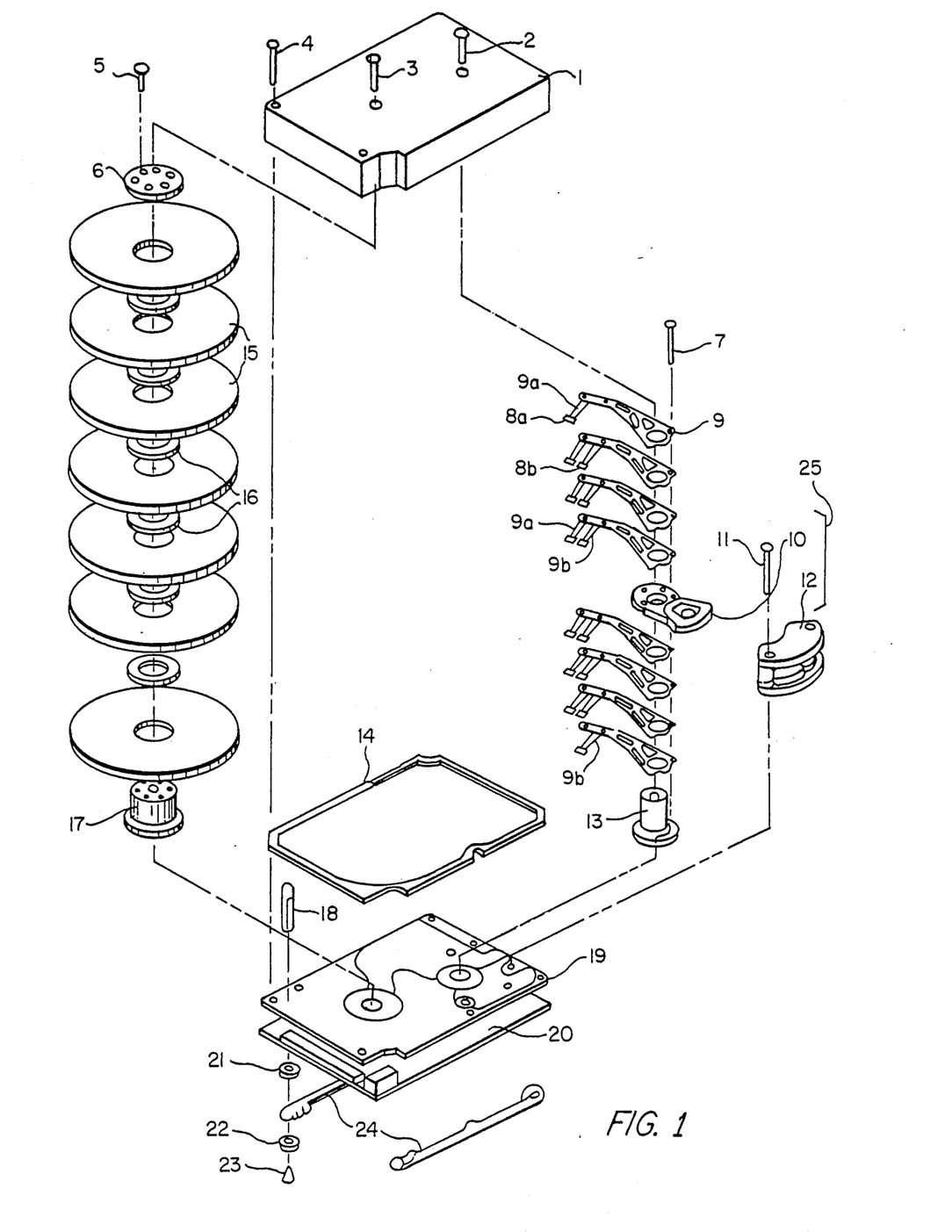
FIG. 1 is an exploded perspective view representing one example of a main part of a magnetic disk apparatus according to one embodiment of the invention.
Figure 2:
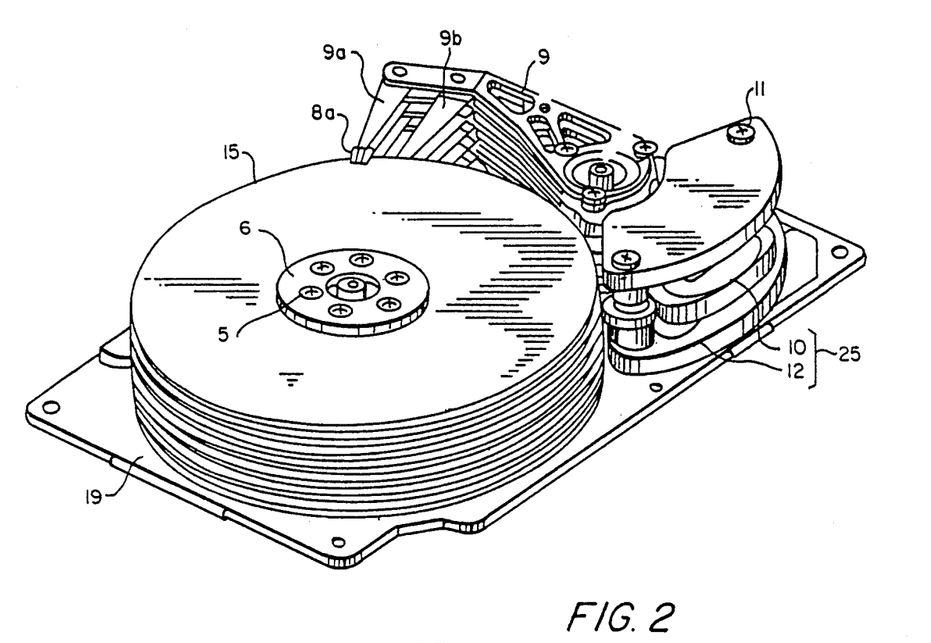
FIG. 2 is a perspective view of the disk apparatus of FIG. 1 in an assembled state with the cover removed.

FIG. 1 is an exploded perspective view representing one example of a main part of a magnetic disk apparatus given in one embodiment of the invention, and FIG. 2 is a perspective view showing an internal structure of the assembled state.

A spindle motor 17 for rotating the magnetic disks at a predetermined speed is fixed on a base 19.

In this case, each magnetic disk 15 is 1.27 mm thick. Seven disks are installed axially on the spindle motor 17 across a spacer 16, which is less than substantially 2.3 mm thick for example. Each magnetic disk 15 is fixed stably with a disk clamp 6 and a screw 5, and the adjacent magnetic disks 15 are spaced 2.3 mm apart.

Here, a required height of the seven magnetic disks 15 and the six disk clamps 6 will be: $(1.27 \times 7) + (2.3 \times 6) = 23$ mm. Therefore, if a travelling space of a head arm 9 at opposite end portions of the plural magnetic disk 15 is estimated at 3 mm as equivalent to the disk clamp 6 as described later, then the height will be 29 mm at highest as a whole.

A pivot 13 with its lower end supported for rotation on base 19 is provided on a side of the plural magnetic disks 15 that is supported by the spindle motor 17 so as to have its shaft arranged in parallel with the spindle motor 17.

A plurality of head arms 9 are fixed on the pivot 13 together with a coil 10 having a coil bobbin 10a (FIGS. 4 and 5) constituting a voice coil motor 25. Further, a plurality of leaf springs 9a and 9b are fixed on each nose portion side of the head arms 9 at a height to correspond with the gaps of the plural magnetic disk 15.

Magnetic heads 8a and 8b positioned opposite to each recording face of the adjacent magnetic disks 15 are supported on the leaf springs 9a and 9b each at positions departing in the direction circumferential of the magnetic disks 15 from each other so as not to overlap in the radial direction.

The leaf springs 9a and 9b are fixed on the nose portions of the head arms 9 in positions corresponding to the upper and lower sides of the plural magnetic disks 15, each supporting one of the magnetic heads 8a and 8b for facing the upper and lower recording faces of adjacent magnetic disks 15, respectively.

The leaf springs 9a and 9b supporting the magnetic heads 8a and 8b provide a constant predetermined bias in a direction urging the magnetic head 8a and 8b onto a recording face of the magnetic disk 15.

Preferably, the head arm 9 is die cut by punching a steel plate of 0.8 mm thickness, for example. Further, the leaf springs 9a and 9b that are supported on the head arm 9 are constructed of stainless steel 0.08 mm thick, for example. The leaf springs 9a and 9b are preferably fixed on the head arm 9 by spot welding, and the fixed portion is covered with a reinforcing member 9c which is 0.3 mm in thickness as shown in FIG. 3b, for example.

Thus in the head arm 9, the thickness including the head arm 9 and the leaf springs 9a, 9b and further the reinforcing member 9c will be 1.56 mm or so at most. The head arm 9 may travel easily in the 2.3 mm gap between the magnetic disks 15. A lightweight construction is realized, and a response speed of displacement of the head arm 9 by a driving force of the voice coil motor 25 is enhanced due to a decrease in inertial mass of the head arm.

Each magnetic head 8a and 8b is smaller in thickness than the 2.3 mm gap of the magnetic disks 15. The heads have a slider part for generating a buoyancy according to an air viscous flow arising on a surface of the magnetic disk 15 by rotation of the magnetic disk 15, and a core part for exchanging information with a recording face of the magnetic disk 15 through magnetic flux.

A yoke 12 constituting a magnetic circuit has, for example, a permanent magnet or the like fixed on base 19 around the pivot 13, constituting the voice coil motor 25 along with the coil part 10 which is enclosed by yoke 12.

That is, the direction and the magnitude of an oscillating torque working on the plural head arms 9 through the coil part 10 will be controlled in accordance with controlling properly the direction and the rate of current supplied to the coil part 10 that pivots on pivot 13 together with the plural head arms 9, thereby placing the plural magnetic heads 8a and 8b supported on each of the head arms 9 through the leaf springs 9a and 9b in positions coordinate with a desired position on each recording face of the plural magnetic disks 15.

The plural magnetic disks 15 are fixed on the spindle motor 17, the plural head arms 9 are fixed on the pivot 13, and the voice coil motor 25 and other components are enclosed by a cover 1 airtight on the base 19 through a packing 14 by screws 4.

An air filter 18 is fixed on a part of the base 19 at a position where it is enclosed by the cover, and thus the construction is such that the internal atmosphere will be purified as an air current is generated to circulate within the cover 1 by rotation of the magnetic disks 15.

In order to stabilize the positional relationship between the spindle motor 17 and the pivot 13, the spindle motor 17 and the pivot 13 are secured from outside the cover 1 by screws 3 and 2.

A control circuit 20 is provided, details not shown, for controlling an operation of the voice coil motor 25 and also for controlling the exchange of information by the magnetic heads 8a and 8b between the magnetic disks 15 and other external components. Frame members 24 are fixed on a lower surface of the base 19 by a plurality of screws 23 through vibration isolating gaskets 21 and 22.

Next, the arrangement of the magnetic head 8a and 8b will be explained with reference to FIGS. 3A and 3B.

Figure 3A:
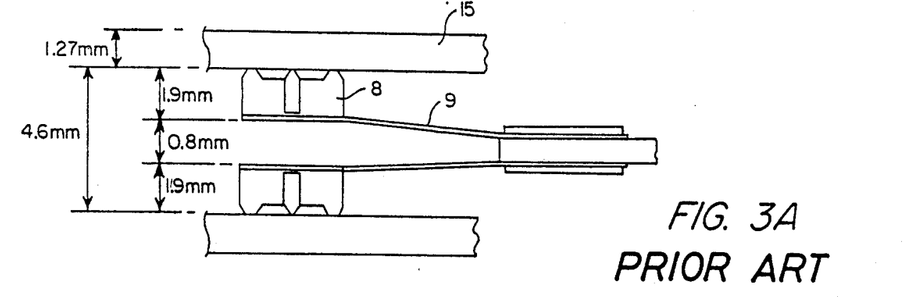
FIG. 3A shows an arrangement of a magnetic head in a conventional magnetic disk apparatus.
Figure 3B:
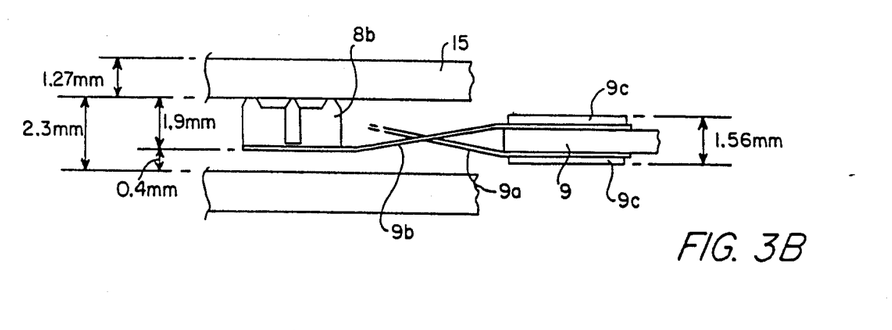
FIG. 3B shows an arrangement of a magnetic head in accordance with the embodiment of FIG. 1.

FIG. 3A shows an arrangement of the magnetic head 8a and 8b in a conventional magnetic disk apparatus. In a conventional magnetic disk apparatus, magnetic heads are arranged in a single line along a radial direction of the magnetic disks 15 as shown in FIG. 3A. Thus the space between each magnetic disk 15 is determined by the sum of twice the height of the magnetic head 8a and twice the height of a margin space that allows for movement of the magnetic head 8a. In FIG. 3A, the space of each magnetic disk 15 is $\{1.9$ mm (height of the magnetic head 8a including leaf spring 9$) \times 2 \} + \{0.4$ mm (margin space for movement of the magnetic head 8a$) \times 2 \} = 4.6$ mm.

Generally the magnetic disk apparatus has a standard size. For example, the height of a so-called 5.25-inch half height magnetic disk apparatus is 41.3 mm. And the height of a so-called 3.5-inch magnetic disk apparatus is 41.3 mm. It is necessary to dispose magnetic disks 15 within about 30 mm of height, because of the need for about 10 mm for disposing one single printed circuit board for controlling the magnetic disk apparatus and other components. When 5 magnetic disks 15 are arranged, the total amount of height is {4.6 mm (space between each magnetic disks 15)×5}+{1.27 mm (thickness of magnetic disk 15)×5}=29.35 mm. So it is impossible to install more than five magnetic disks 15 within a conventional disk apparatus using conventional techniques.

Figure 4:
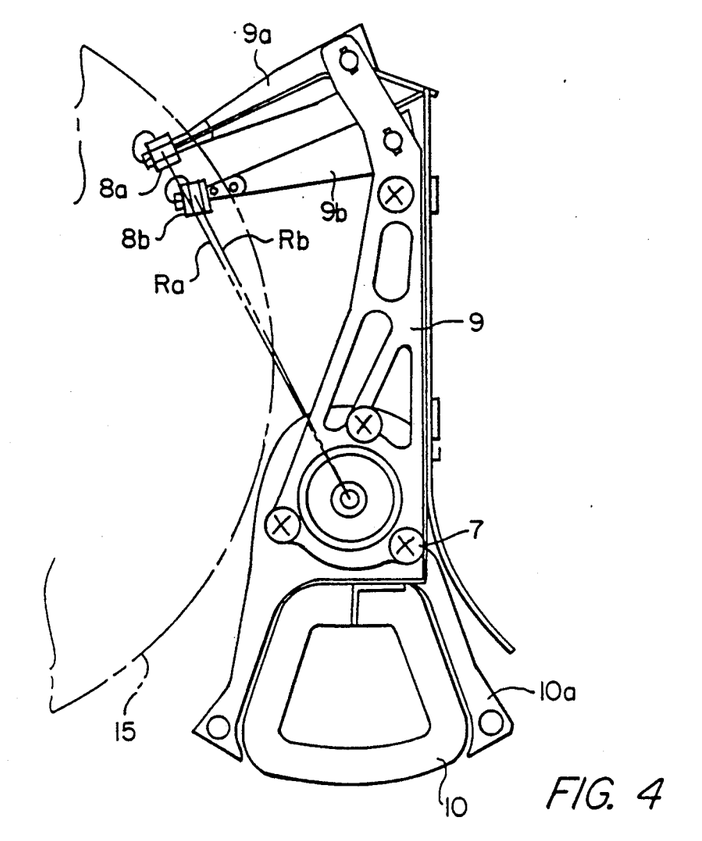
FIG. 4 is a plan view of a head assembly according to the embodiment of the invention of FIG. 1.
Figure 5:
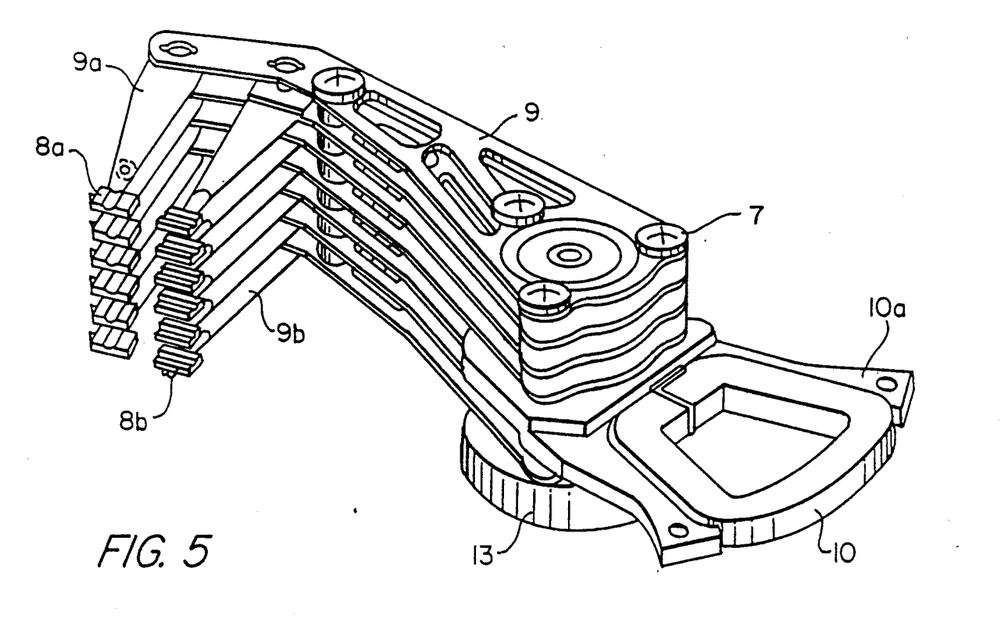
FIG. 5 is a perspective view showing a head assembly of the embodiment of the invention of FIG. 1.

FIG. 3B shows a mounting arrangement of the magnetic heads 8a and 8b that enables more than five disks to be packaged together. FIGS. 4 and 5 further show the arm and head mounting arrangement according to the first embodiment of the invention.

The magnetic heads 8a and 8b opposite each other are arranged with an offset in a direction of rotation of the magnetic disks 15 as shown in FIG. 4. For this arrangement, the space of each magnetic disk 15 is 1.9 mm (height of the magnetic head 8b including the leaf spring 9b)+0.4 mm (margin space that allows for movement of the magnetic head 8a)=2.3 mm. In this case, more than five magnetic disks 15 can be disposed within about a 30 mm height limit.

According to the magnetic disk apparatus of the present embodiment, six or more magnetic disks 15 can be packaged, for example, in a 5.25-inch half height magnetic disk apparatus (146 mm wide×203 mm long×41.3 mm height) or a 3.5-inch standard size magnetic disk apparatus (101.6 mm wide×146 mm long×41.3 mm height), thus realizing a large capacity construction of the magnetic disk apparatus.

As shown in FIG. 4, magnetic heads 8a and 8b are arranged with an offset between each other in a direction of rotation of magnetic disks 15. Accordingly, a rotation radius $R_a$ of the magnetic heads 8a and a rotation radius $R_b$ of the magnetic heads 8b are different. The leaf springs 9a and 9b extend in a radial direction of disks 15, and are arranged in parallel with each other. The leaf springs 9a and 9b are secured to one portion of head arm 9 substantially at a right angle.

Figures 9, 10:
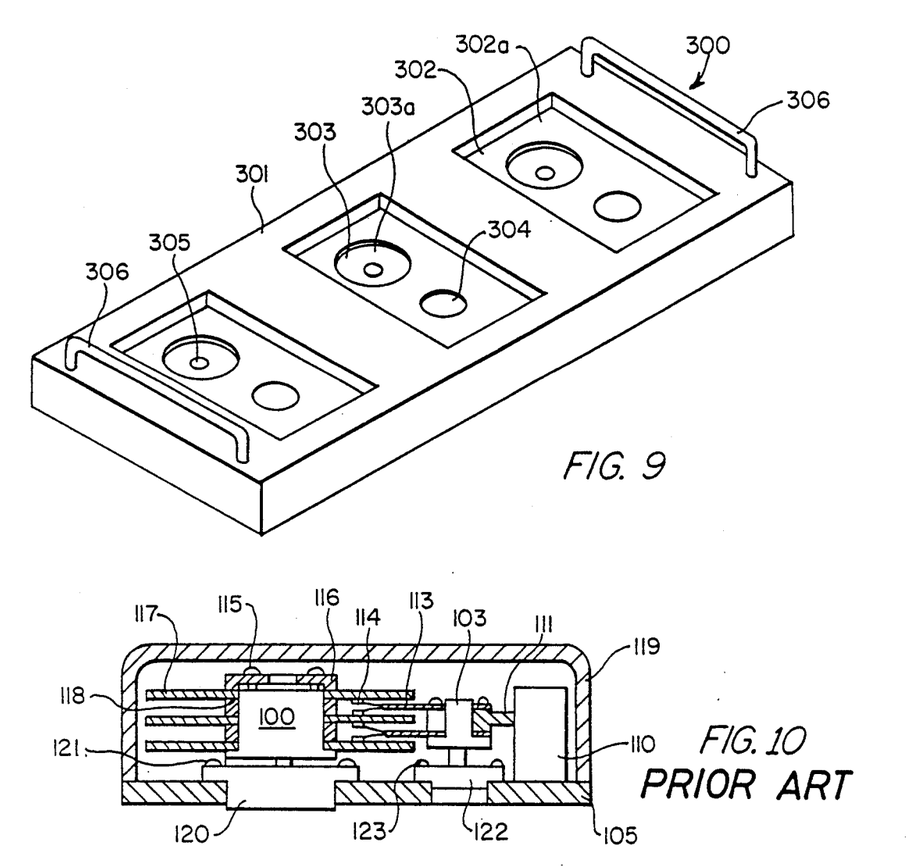
FIG. 9 is a perspective view representing one example of the assembly jig.
FIG. 10 is a sectional view representing one example of the construction of a conventional magnetic disk apparatus.

In FIG. 10, one example of an internal structure of a conventional magnetic disk apparatus is shown. A plurality of magnetic disks 117 are held to rotate on a spindle motor 100, spaced apart by a spacer 118, and held to the spindle by a disk clamp 116 with a plurality of screws 115. A plurality of magnetic heads 114 are pivotally mounted on a pivot 103 through a head arm 113. Further, a yoke 110 is fixed to base 105 to constitute a magnetic circuit and a coil part 111 is fixed to pivot 103 to constitute a voice coil motor together therewith.

A seeking motion for placing the magnetic head 114 supported on a nose portion of the head arm 113 in a desired arbitrary radial position of the magnetic disk 117 is carried out by driving the head arm 113 by an oscillating torque generated when a current is supplied to the coil part 111.

The spindle motor 100 and the pivot 103 are provided with housings 120 and 122 respectively, and both the housings 120 and 122 are fitted and fixed in fitting holes 126 and 127 formed on the common base 105 respectively with screws 121 and 123. In this manner, it is necessary to construct a shoulder portion 120a and 120b (FIGS. 11 and 12), and the heights of reference size 124 and 125 become bigger.

Then, the magnetic disks 117, the voice coil motor and other components are enclosed and protected by a cover 119 fitted close onto the base 105.

Figure 11:
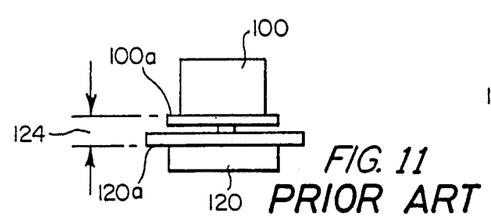
FIG. 11 is a side view showing an outline of a conventional spindle motor.
Figure 12:
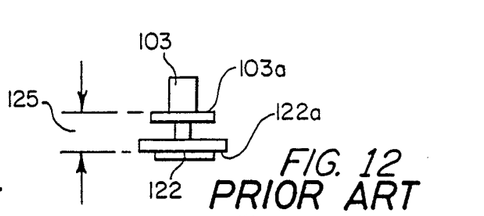
FIG. 12 is a side view showing an outline of a conventional pivot.

Here, in order to secure a relative positional precision between the magnetic disk 117 and the magnetic head 114, an extremely high precision will be required in order to attain a reference size 124 between the magnetic disk mounting reference plane 100a in the spindle motor 100 and a shoulder portion 120a of the housing 120 as shown in FIG. 11, and further of a reference size 125 between a head arm mounting reference plane 103a in the pivot 103 and a shoulder portion 122a of the housing 122, as shown in FIG. 12.

Figure 13:
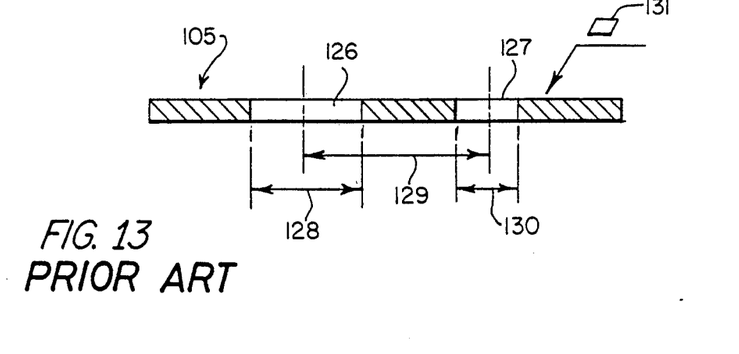
FIG. 13 is a side view showing an outline of a conventional base.

Consequently, in order to attain reference sizes 124 and 125 with precision, each mounting reference plane is generally subjected to machining to a close tolerance after assembly of the spindle motor 100 on the housing 120, and also after assembly of the pivot 103 on the housing 122. Further, as shown in FIG. 13, it is apparent that hole sizes 128, 130 in the base 105, a hole position size 129, and further an out-of-flat 131 must be machined after assembly to achieve such high precision.

Be that as it may, such working precision of each component naturally has a limit, which comes normally in the range of ±0.03 mm or so, therefore a precise relative positioning of the magnetic disk and the magnetic head is finally that for which the reference size 24 in the spindle motor 100, the reference size 25 in the pivot 103, the out-of-flat 131 of the base 105 and so forth are machined to attain a precision within a range of ±0.01 mm or so.

Accordingly, in the conventional magnetic disk apparatus, a precise relative positioning of the magnetic disk and the magnetic head has a limit at ±0.01 mm or so, and the floating gap limit of the magnetic head that is set becomes relatively large as a result. This positioning problem has prevented large capacity construction of a magnetic disk apparatus until the present invention.

Figure 6:
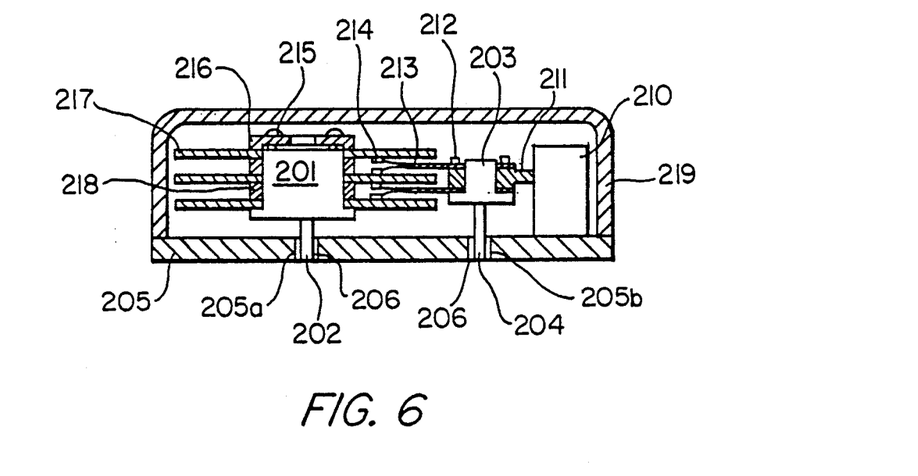
FIG. 6 is a sectional view showing an outline of the construction of a magnetic disk apparatus according to another embodiment of the invention.
Figure 7:
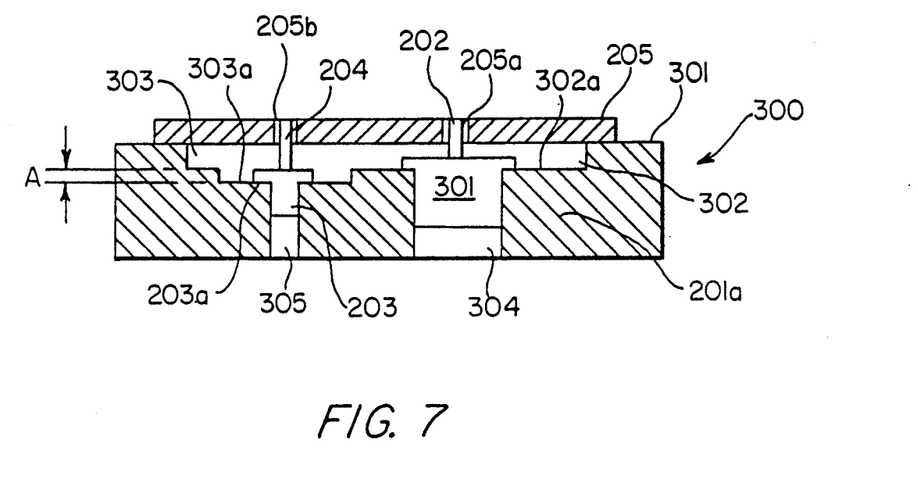
FIG. 7 is a sectional view illustrating an assembling step using an assembly jig.
Figure 8:
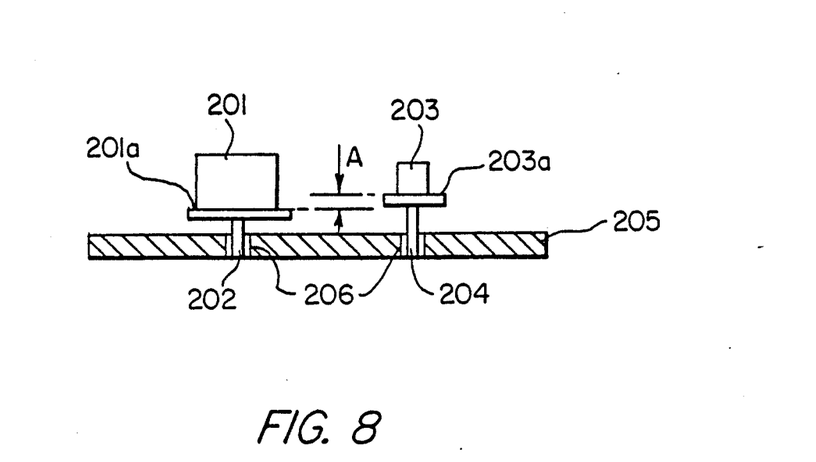
FIG. 8 is an explanatory drawing representing a partial assembly of the magnetic disk apparatus according to the embodiment of FIG. 6.

FIG. 6 is a sectional view representing a main part of a magnetic disk apparatus according to another embodiment of the invention. FIG. 7 and FIGS. 8a and 8b are sectional views illustrating one example of an assembly process for manufacturing the magnetic disk apparatus of FIG. 6.

First, a summary of the construction of the magnetic disk apparatus of this embodiment in a complete state will be described according to FIG. 6.

As shown in FIG. 6, a spindle motor 201 is supported vertically in a fitting hole 205a of a base 205 through a shaft part 202 that is fixed to base 205. A plurality of magnetic disks 217 are installed on the spindle motor 201 and are spaced out regularly and axially apart by a plurality of spacers 218. The relation is retained stably by a plurality of screws 215 and a disk clamp 216 installed on an end portion of the spindle motor 201.

A plurality of magnetic heads 214 operating for recording and reproducing information on each recording face of the magnetic disks 217 are fixed on a head arm 213 that is pivotally supported on a pivot 203 for rotation in the direction of the plane of the magnetic disks 217, and shifted radially with respect to the corresponding magnetic disks 217 by an oscillation displacement of the head arm 213 in a seeking operation.

The pivot 203 is fixed with the shaft parallel to the spindle motor 201 and a shaft part 204 is fixed in a fitting hole 205b of the base 205 with an adhesive.

A coil part 211 constituting a voice coil motor $V_1$ is fixed on the pivot 203 supporting the plural head arms 213 thereon, and is partly enclosed displaceably in a yoke 210 fixed on a side of the base 205 to constitute a magnetic circuit.

The head arm 213 is fixed on the pivot together with the coil part 211 and is driven by a torque working on the coil part 211 according to a mutual action of a magnetic field generated when a current is supplied to the coil part 211 and the magnetic circuit of the yoke 210, thus carrying out the aforementioned seeking operation.

The plural magnetic disks 217 are fixed on the spindle motor 201, the plural head arms 213 are fixed on the pivot 203, and the voice coil motor V and the other components are enclosed by a cover 219 installed airtight on the base 205. Thus, the construction is such that the recording face of the magnetic disks 217 and the magnetic heads 214 shift minutely while the head floats on the recording face, and the apparatus is protected from external dust and other contaminants.

Here, as described in the conventional method, in order to control a floating gap formed between the magnetic disks 217 and the magnetic heads 214 with high precision, it is essential that the relative position between a disk fitting reference plane 201a of the spindle motor 201, and a head fitting reference plane 203a of the head arm 213 be accurately established.

Therefore, in the magnetic disk apparatus of this embodiment, the procedure for installing the spindle motor 201 and the pivot 203 to the base 205 is carried out by means of an assembly jig 300 shown in FIGS. 7 to 9.

As illustrated therein, the assembly jig 300 comprises a block member having recesses 302 and 303 provided therein to a depth different from each other with respect to a working plane 301 on which the base 205 is placed. The bottom portions 302a and 303a of the recesses are finished precisely so as to have a predetermined difference in level A as shown in FIG. 7.

Fitting-up holes 304 and 305 in which to insert the spindle motor 201 and the pivot 203 respectively are bored in block 300 at predetermined positions relative to the recesses 302 and 303, and the construction is such that a relative positional relation between the disk fitting reference plane 201a and the head fitting reference plane 203a of the disk apparatus undergoing assembly will be accurately determined simply by tentatively inserting and locking the spindle motor 201 and the pivot 203 in the fitting-up holes 304 and 305 respectively.

FIG. 9 shows an assembly jig 300 in this embodiment for assembling a plural set of spindle motors 201 and pivots 203 to a base 205 concurrently. A handle 306 is installed on one part of the assembly jig 300 to assist in handling the jig. One example of using the jig in assembling the magnetic disk disk apparatus of the invention will be described as follows.

First, a plural set of spindle motors 201 and pivots 203 are inserted in each of a plural set of fitting-up holes 304 and 305 of the assembly jig 300 respectively, as shown in FIG. 7. The spindle motors and pivots are fixed tentatively with the disk fitting reference plane 201a and the head fitting reference plane 203a as correct.

Next, the base 205 is placed on the working plane 301 of the assembly jig 300 so that the shaft parts 202 and 204 of the spindle motor 201 and the pivot 203 will be inserted in the fitting holes 205a and 205b formed on the base 205.

Then, an adhesive 206 is poured into gaps of the shaft parts 202 and 204 of the spindle motor 201 and the pivot 203 in each of the fitting holes 205a and 205b formed on the base 205, thus locking the shaft parts 202 and 204 to the base 205.

After the shaft parts 202 and 204 are adhered to the base 205 and stabilized through a predetermined time, the base 205 is lifted vertically from the working plane 301, and thus the spindle motor 201 and the pivot 203 are fixed to the base 205, as shown in FIG. 8, and are thereafter extracted from the assembly jig 300.

In this case, a relative position of the spindle motor 201 and the pivot 203 with respect to the base 205 is constructed precisely with the disk fitting reference plane 201a and the head fitting reference plane 203a being likewise precisely positioned.

As described, according to this embodiment, since there is no shoulder portion of shaft parts 202 and 204 as in the conventional construction, the assembly of the present invention uses less space for mounting the motor 201 and pivot 203.

Furthermore, since the disk fitting reference plane 201a of the spindle motor 201, and the head fitting reference plane 203a of the pivot 203 are placed in position directly by the assembly jig 300, a relative positional precision of the spindle motor 201 and the pivot 203 can be sharply enhanced as compared with the conventional assembling method. For example, according to research conducted by the inventors, it is confirmed that a relative positional precision coming within ±0.01 mm will be realized from using the assembly jig of this embodiment.

As a result, a floating gap between the magnetic disks 217 fixed on the spindle motor 201 and the magnetic heads supported on the head arm 213 on a side of the pivot 203 can be accurately maintained. Thus an enhancement of memory capacity of the magnetic disk apparatus can be realized by narrowing the floating gap.

Further, a precise finishing step is not needed, so no more steps than are necessary for assembly of the components to the base 205 are required. Therefore the cost of manufacturing the parts such as the spindle motor 201, pivot 203 and others can sharply reduced.

Further, screws are not used for fixing the spindle motor 201 and the pivot 203 to the base 205, therefore the number of assembly steps is reduced.

This invention has been described above with reference to the embodiments, however, the invention is not necessarily limited to the above-described embodiments, and it is believed that modification or variations of the invention are possible without departing from the spirit and scope of the invention as set forth in the claims.

We claim:

1. A magnetic disk apparatus, comprising:
   a base member and a cover mounted on said base member to form an enclosure;
   support means for rotatably supporting a plurality of magnetic disks within said enclosure, wherein at least six of said magnetic disks are supported by said support means and wherein a space between said magnetic disks is less than substantially 2.3 mm;
   motor means for rotating said magnetic disks, said motor means being secured to said base member;
   first and second transducer means for writing information on and reading information from upper and lower surfaces of adjacent ones of said magnetic disks;
   first and second spring means having opposite ends for securing said first and second transducer means on one of said ends in order to position said first and second transducer means in close proximity to both surfaces of adjacent ones of said magnetic disks, said spring means extending in a radial direction with respect to said magnetic disks;

arm means for supporting both said spring means, each of said spring means being connected at the other of said ends to said arm means and being arranged substantially within the same plane parallel to said magnetic disks;

said first and second spring means being substantially perpendicular to a portion of said arm means;

positioning means for moving said arm means in order to position said first and second transducer means in predetermined positions; and control means mounted on a circuit board for controlling said magnetic disk apparatus, said circuit board being mounted within said enclosure adjacent said base member.

2. A magnetic disk apparatus according to claim 1, wherein said first and second transducer means are positioned between upper and lower surfaces of said adjacent magnetic disks and are disposed so as not to overlie one another in a direction generally perpendicular to the planar extending direction of said magnetic disks.

3. A magnetic disk apparatus according to claim 2, wherein the space between said magnetic disks is substantially the same as a sum of the heights of said first transducer means and a margin space that allows for movement of said first transducer means.

4. A magnetic disk apparatus according to claim 1, wherein the thickness of said magnetic disk is substantially 1.27 mm.

5. A magnetic disk apparatus according to claim 4 wherein the height of said apparatus is substantially 41.3 mm.

6. A magnetic disk apparatus according to claim 5, wherein the size of said magnetic apparatus is substantially 101.6 mm wide×146 mm long×41.3 mm height, and the diameter of said magnetic disk is substantially 95 mm.

7. A magnetic disk apparatus according to claim 5, wherein the size of said magnetic apparatus is substantially 146 mm wide×203 mm long×41.3 mm height, and the diameter of magnetic disk is substantially 130 mm.

8. A magnetic apparatus according to claim 1, wherein said motor means is secured to said base member by adhesive.

9. A magnetic apparatus according to claim 1, wherein said positioning means comprises:

a pivot shaft for supporting said arm means for rotational movement relative to said magnetic disks; and voice coil motor means for moving said arm means to said predetermined positions.

10. A magnetic disk apparatus according to claim 9, wherein said pivot shaft is secured to said base member by adhesive.

11. A magnetic disk apparatus, comprising:

a base member and a cover mounted on said base member to form an enclosure;

support means for rotatably supporting a plurality of magnetic disks within said enclosure;

motor means for rotating said magnetic disks, said motor means being secured to said base member;

first and second transducer means for writing information on and reading information from upper and lower surfaces of adjacent ones of said magnetic disks;

first and second spring means having opposite ends for securing said first and second transducer means on one of said ends in order to position said first and second transducer means in close proximity to both surfaces of adjacent ones of said magnetic disks, said spring means extending in a radial direction with respect to said magnetic disks;

arm means for supporting both said spring means, each of said spring means being connected at the other of said ends to said arm means, said first and second transducer means being positioned between upper and lower surfaces of adjacent ones of said magnetic disks and being disposed so as not to overlie one another in the direction generally perpendicular to the planar surfaces of said magnetic disks;

a pivot shaft means for rotatably supporting said arm means, said pivot shaft means being mounted on said base member;

voice coil motor means for moving said arm means in order to position said first and second transducers in predetermined positions;

said support means rotatably supporting said plurality of magnetic disks with a space between adjacent ones of said magnetic disks that is substantially the same as a sum of the heights of said first transducer means and the margin space that allows for movement of said first transducer means;

shaft means for rotatably fixing said support means to said base member;

at least one of said pivot shaft means and said shaft means being secured to said base member by an adhesive;

said motor means for rotating said magnetic disks being mounted to said base member within said enclosure; and control means mounted on a circuit board for controlling said magnetic disk apparatus, said circuit board being arranged adjacent said base member within said enclosure.

12. A magnetic disk apparatus according to claim 11, wherein at least six of said disks are supported by said support means.

13. A magnetic disk apparatus according to claim 12, wherein the space between said magnetic disks is less than substantially 2.3 mm.

14. A magnetic disk apparatus according to claim 13, wherein the thickness of said magnetic disk is substantially 1.27 mm.

15. A magnetic disk apparatus according to claim 14, wherein the height of said apparatus is substantially 41.3 mm.

16. A magnetic disk apparatus according to claim 15, wherein the size of said magnetic apparatus is substantially 101.6 mm wide×146 mm long×41.3 mm height, and the diameter of said magnetic disk is substantially 95 mm.

17. A magnetic disk apparatus according to claim 15, wherein the size of said magnetic apparatus is substantially 146 mm wide×203 mm long×41.3 mm height, and the diameter of magnetic disk is substantially 130 mm.

18. A magnetic disk apparatus according to claim 11, wherein both said shaft means and said pivot shaft means are secured to said base member by adhesive.

* * * * *